(12) United States Patent
Watanabe et al.

(10) Patent No.: US 11,491,916 B2
(45) Date of Patent: Nov. 8, 2022

(54) TOW ASSIST APPARATUS

(71) Applicant: AISIN CORPORATION, Kariya (JP)

(72) Inventors: Kazuya Watanabe, Anjo (JP); Kinji Yamamoto, Anjo (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 16/755,225

(22) PCT Filed: Oct. 4, 2018

(86) PCT No.: PCT/JP2018/037289
§ 371 (c)(1),
(2) Date: Apr. 10, 2020

(87) PCT Pub. No.: WO2019/073909
PCT Pub. Date: Apr. 18, 2019

(65) Prior Publication Data
US 2020/0317126 A1  Oct. 8, 2020

(30) Foreign Application Priority Data
Oct. 13, 2017  (JP) .............................. JP2017-199810

(51) Int. Cl.
| B60R 21/00 | (2006.01) |
| B60R 1/00 | (2022.01) |
| B60R 11/04 | (2006.01) |
| B62D 13/06 | (2006.01) |
| B60R 21/0134 | (2006.01) |
| B60R 1/12 | (2006.01) |

(52) U.S. Cl.
CPC .............. B60R 1/003 (2013.01); B60R 11/04 (2013.01); B62D 13/06 (2013.01); B60R 21/0134 (2013.01); B60R 2001/1253 (2013.01)

(58) Field of Classification Search
CPC ..... B60R 1/003; B60R 11/04; B60R 21/0134; B60R 2001/1253; B62D 13/06
See application file for complete search history.

(56) References Cited

U.S. PATENT DOCUMENTS

| 5,152,544 | A | 10/1992 | Dierker, Jr. et al. |
| 2016/0264046 | A1 | 9/2016 | Bochenek et al. |
| 2017/0073004 | A1* | 3/2017 | Shepard ............... B62D 15/028 |
| 2017/0106865 | A1* | 4/2017 | Lavoie .................. B62D 13/06 |
| 2017/0280091 | A1* | 9/2017 | Greenwood ....... H04N 5/23238 |
| 2019/0080185 | A1* | 3/2019 | Fürsich ..................... B60R 1/00 |

FOREIGN PATENT DOCUMENTS

| JP | 04-169366 A | 6/1992 |
| JP | 2012-166647 A | 9/2012 |

OTHER PUBLICATIONS

International Search Report for PCT/JP2018/037289 dated Dec. 11, 2018 [PCT/ISA/210].

* cited by examiner

*Primary Examiner* — Zhihan Zhou
(74) *Attorney, Agent, or Firm* — Sughrue Mion, PLLC (57) ABSTRACT

A tow assist apparatus includes a hardware processor to: detect, at a predetermined period, an angle of tilt of a towed vehicle to a towing vehicle towing the towed vehicle, the tilt arising when the towing vehicle moves backward; calculate angle change information representing a temporal change in the detected angle; and output an alarm when the angle change information exceeds a threshold.

5 Claims, 10 Drawing Sheets

TOW ASSIST APPARATUS

CROSS-REFERENCE TO RELATED APPLICATIONS

This application is national stage application of International Application No. PCT/JP2018/037289, filed Oct. 4, 2018, which designates the United States, incorporated herein by reference, and which claims the benefit of priority from Japanese Patent Application No. 2017-199810, filed Oct. 13, 2017, the entire contents of which are incorporated herein by reference.

TECHNICAL FIELD

The present invention relates to a tow assist apparatus.

BACKGROUND ART

There has been conventionally known a towing vehicle that tows a towed vehicle (trailer). Conventionally, there is known a technique for performing warning or brake control by detecting a swaying motion of a towed vehicle occurring when a towing vehicle travels straight while towing the towed vehicle.

CITATION LIST

Patent Literature

Patent Document 1: JP 2012-166647 A
Patent Document 2: JP 04-169366 A

SUMMARY OF INVENTION

Problem to be Solved by Invention

However, the conventional technique does not disclose a mechanism for urging safe driving when the towing vehicle moves backward while towing the towed vehicle.

Means for Solving Problem

A tow assist apparatus according to an embodiment of the present invention includes: a hardware processor configured to: detect, at a predetermined period, an angle of tilt of a towed vehicle to a towing vehicle towing the towed vehicle, the tilt arising when the towing vehicle moves backward; calculate angle change information representing a temporal change in the detected angle; and output an alarm when the angle change information exceeds a threshold. According to this configuration, the alarm is output when the angle change information representing the temporal change in the angle of tilt of the towed vehicle when the towing vehicle moves backward exceeds the threshold. Thus, it is possible to urge safe driving when the towing vehicle moves backward while towing the towed vehicle.

In the tow assist apparatus according to an embodiment, the hardware processor is further configured to: acquire a captured image including the towed vehicle, the captured image being captured by one or more cameras for capturing an image around the towing vehicle; and output the alarm in a state where a display image generated based on the captured image is displayed, the display image including the towed vehicle. According to this configuration, when the angle change information exceeds the threshold, the display image including the towed vehicle is displayed, the display image being based on the captured image around the towing vehicle. Thus, it is possible for the driver to visually recognize a moving state of the towed vehicle, and to ascertain that the towed vehicle is moving with an angle different from his/her prediction.

In the tow assist apparatus according to an embodiment, the hardware processor is further configured to: acquire a first side image and a second side image, the first side image representing an image captured by a first side camera of the cameras capturing an image on a right side of the towing vehicle, the second side image representing an image captured by a second side camera of the cameras capturing an image on a left side of the towing vehicle; and display, when the angle change information exceeds the threshold, the display image generated based on one of the first side image and the second side image, the one corresponding to a side to which the towed vehicle tilts. According to this configuration, the display image based on the side image on the tilt side of the towed vehicle is displayed, so that it enables the driver to easily visually recognize the tilt condition of the towed vehicle.

DESCRIPTION OF EMBODIMENTS

Exemplary embodiments of a tow assist apparatus according to the present invention will be described below in detail with reference to the accompanying drawings.

First Embodiment

Figure 1:
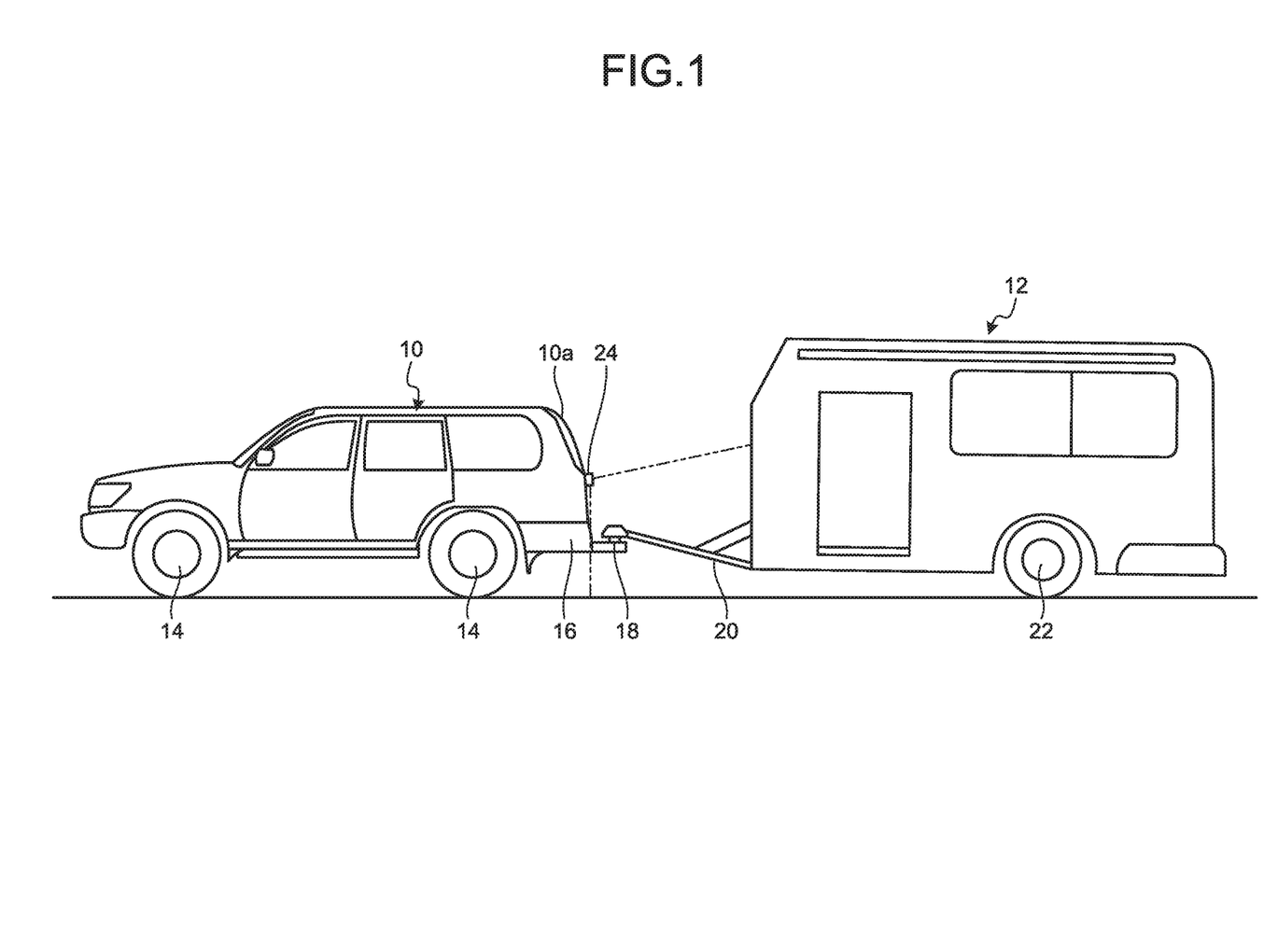
FIG. 1 is a side view of a towing vehicle and a towed vehicle towed by the towing vehicle according to a first embodiment.
Figure 2:
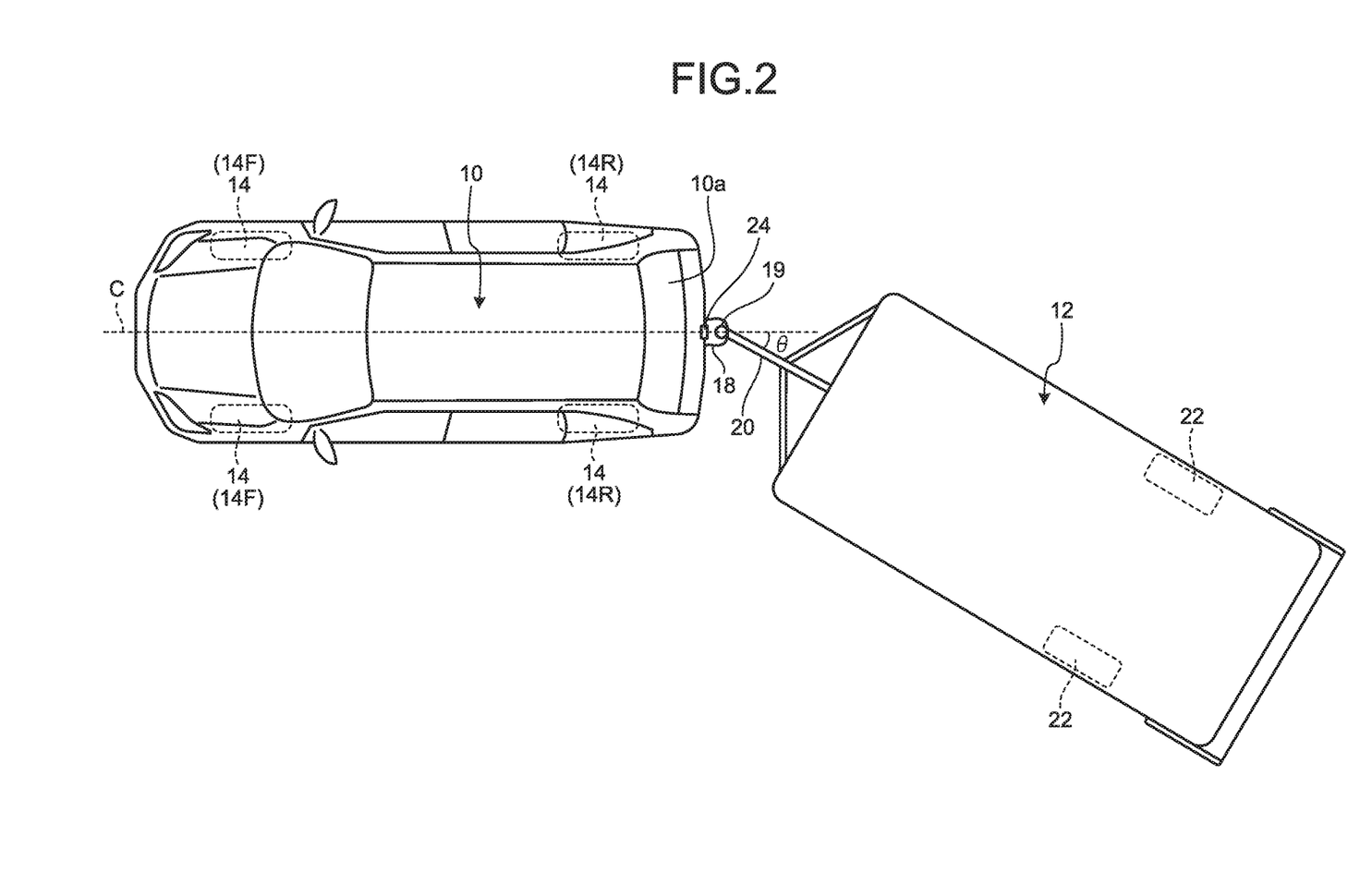
FIG. 2 is a top view of the towing vehicle and the towed vehicle towed by the towing vehicle according to the first embodiment.

FIG. 1 is a side view of a towing vehicle 10 in which a tow assist apparatus is installed and a towed vehicle (trailer) 12 towed by the towing vehicle 10 according to a first embodiment. In FIG. 1, the leftward direction on the sheet is defined as a forward direction (forward-moving direction) with respect to the towing vehicle 10, and the rightward direction on the sheet is defined as a backward direction (backward-moving direction) with respect to the towing vehicle 10. FIG. 2 is a top view of the towing vehicle 10 and the towed vehicle 12.

The towing vehicle 10 may be, for example, a motor vehicle (an internal combustion engine motor vehicle) which includes an internal combustion engine (an engine, not illustrated) as a driving source, a motor vehicle (an electric vehicle, a fuel-cell electric vehicle, or the like) which includes an electric motor (a motor, not illustrated) as a driving source, or a motor vehicle (a hybrid vehicle) which includes both an internal combustion engine and an electric motor as driving sources. The towing vehicle 10 may be a sport utility vehicle (SUV) as illustrated in FIG. 1, or a so-called "pick-up truck" which includes a loading platform provided on the rear side of the vehicle. Further, the towing vehicle 10 may be a typical passenger vehicle. The towing vehicle 10 can be equipped with various transmissions and equipped with various devices (systems, components, and the like) required for driving the internal combustion engine or the electric motor. Further, the type, number, layout, and the like of the devices related to driving of wheels 14 in the towing vehicle 10 can be variously set.

A towing device 18 (hitch) for towing the towed vehicle 12 projects from, for example, the lower central part of a rear bumper 16 in the vehicle-width direction in the towing vehicle 10. The towing device 18 is fixed to, for example, a frame of the towing vehicle 10. The towing device 18 includes, for example, a hitch ball 19, which is provided in a standing manner in the vertical direction (the up-down direction of the vehicle), and includes a spherical tip. The hitch ball 19 is covered with a coupler which is provided on the tip of a coupling member 20, which is fixed to the towed vehicle 12. As a result, the towing vehicle 10 and the towed vehicle 12 are coupled to each other, and the towed vehicle 12 is swingable (turnable) in the vehicle-width direction with respect to the towing vehicle 10. In other words, the hitch ball 19 transmits back-and-forth and right-and-left movements to the towed vehicle 12 (the coupling member 20), and receives power of acceleration and deceleration.

The towed vehicle 12 may be, for example, a box-shaped type including at least one of a boarding space, a living section, and a storage space as illustrated in FIG. 1, or a loading platform type which is to be loaded with a cargo (e.g., a container or a boat). The towed vehicle 12 illustrated in FIG. 1 includes, for example, a pair of trailer wheels 22. The towed vehicle 12 of FIG. 1 is a driven vehicle which includes no driving wheel and no steering wheel, and includes a driven wheel.

An imaging unit 24 is provided on a wall under a rear hatch 10a, which is provided on the rear side of the towing vehicle 10. The imaging unit 24 is, for example, a digital camera which includes a built-in image sensor such as a charge coupled device (CCD) or a CMOS image sensor (CIS). The imaging unit 24 is a rear camera which captures an image in the backward-moving direction (rear side) of the towing vehicle 10. The imaging unit 24 is capable of outputting moving image data (continuous images) at a predetermined frame rate. The imaging unit 24 includes a wide-angle lens or a fisheye lens, and is capable of capturing an image in the range of, for example, 140° to 220° in the horizontal direction. Further, an optical axis of the imaging unit 24 is set obliquely downward. Thus, the imaging unit 24 sequentially captures images of an area including the rear end of the towing vehicle 10, the coupling member 20, and at least the front end of the towed vehicle 12 (e.g., an area indicated by a chain double-dashed line, refer to FIG. 1), and outputs the captured images (rear images representing images of the rear side of the towing vehicle 10). The image (rear image) captured by the imaging unit 24 can be used in detection of an angle of tilt of the towed vehicle 12 to the towing vehicle 10 (thereinafter, referred to as the "coupling angle θ"), In this example, as illustrated in FIG. 2, the coupling angle θ can be defined as an angle of the coupling member 20 (a center line of the towed vehicle 12) to a center line C of the towing vehicle 10 (a straight line parallel to a longitudinal axis of the towing vehicle 10). Various known methods can be used as a method for recognizing the coupling angle θ from the image. For example, a method which recognizes the coupling angle θ by attaching a marker to the coupling member 20 or a method which recognize the coupling angle θ by using pattern matching may be employed. Further, not limited to image recognition, for example, a sensor for detecting the coupling angle θ may be provided on the hitch ball 19.

Note that, in another embodiment, the towing vehicle 10 may include a plurality of imaging units to capture images on the lateral side and the front side of the towing vehicle 10 in order to recognize environments around the towing vehicle 10. Further, the towed vehicle 12 may include an imaging unit on the lateral side or the rear side thereof. Arithmetic processing and image processing are executed on the basis of captured image data obtained by a plurality of imaging units. Accordingly, it is possible to generate an image in a wider viewing angle or generate a virtual bird's-eye view (plan image) of the towing vehicle 10 viewed from above.

Figure 3:
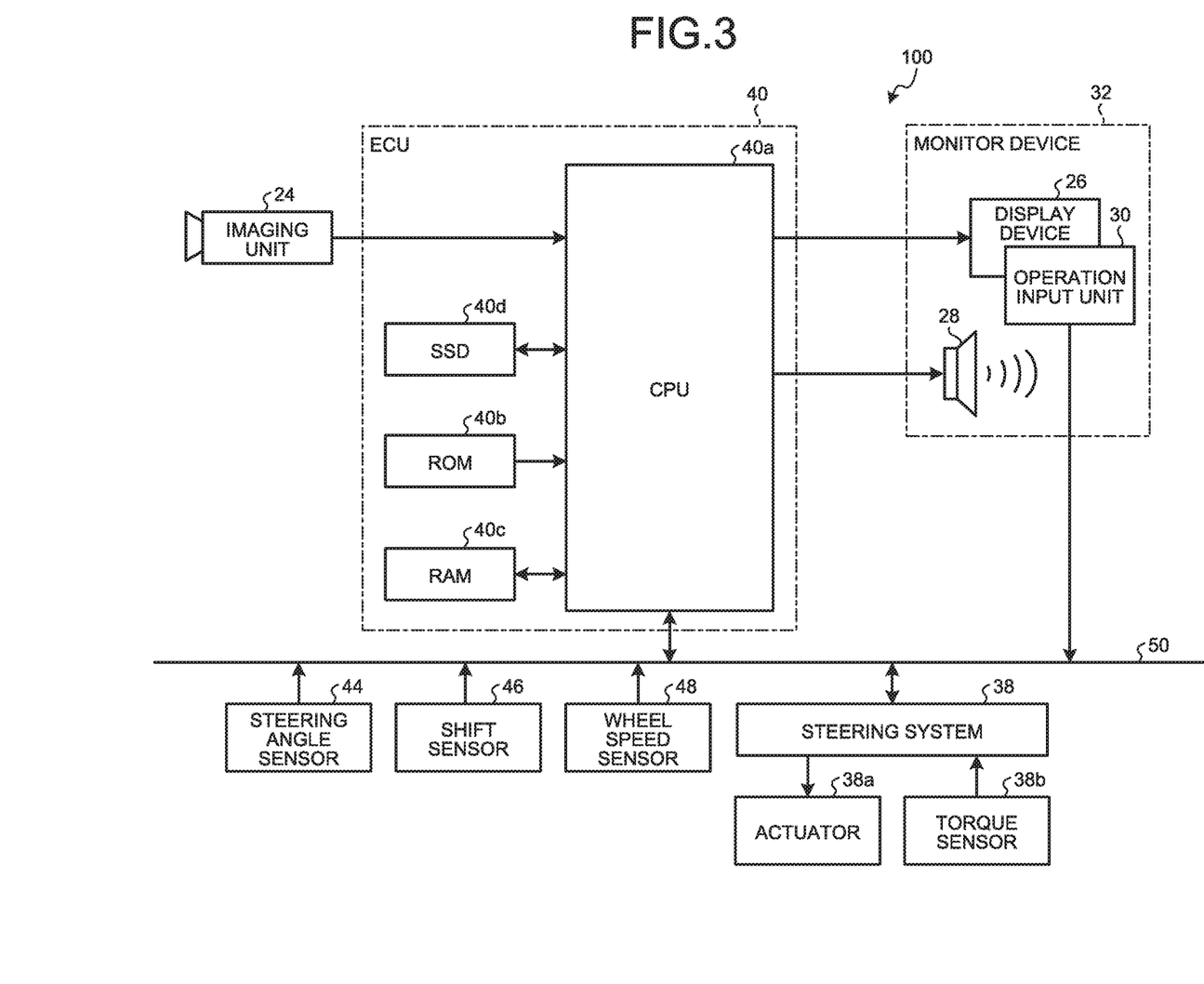
FIG. 3 is a diagram illustrating the configuration of a tow assist system according to the first embodiment.

FIG. 3 is a diagram illustrating the configuration of a tow assist system 100 (an example of the tow assist apparatus) included in the towing vehicle 10. As illustrated in FIG. 3, the tow assist system 100 includes an ECU 40, a monitor device 32, a steering system 38, a steering angle sensor 44, a shift sensor 46, a wheel speed sensor 48, and the like, which are electrically connected to each other over an intra-company network as a telecommunication circuit. An intra-company network 50 is configured as, for example, a controller area network (CAN). The ECU 40 is capable of controlling the steering system 38 and the like by transmitting a control signal over the intra-company network 50. Further, the ECU 40 is capable of receiving detection results of a torque sensor 38b, the steering angle sensor 44, the shift sensor 46, the wheel speed sensor 48, and the like, and an operation signal of an operation input unit 30 and the like over the intra-company network 50.

The ECU 40 includes, for example, a CPU 40a (central processing unit), a ROM 40b (read only memory), a RAM 40c (random access memory), and an SSD 40d (solid state drive, flash memory). The CPU 40a is capable of reading a program which is installed and stored in a nonvolatile storage device such as the ROM 40b, and executing arithmetic processing in accordance with the program. Further, in this example, the image (rear image) captured by the imaging unit 24 is also input to the CPU 40a. The RAM 40c temporarily stores therein various pieces of data used in arithmetic operations in the CPU 40a. Further, the SSD 40d is a rewritable nonvolatile storage unit, and capable of storing data therein even when power of the ECU 40 is turned off. The CPU 40*a*, the ROM 40*b*, the RAM 40*c*, and the like may be integrated in the same package. Further, the ECU 40 may include another logical operation processor such as a digital signal processor (DSP), a logic circuit, or the like instead of the CPU 40*a*. Further, a hard disk drive (HDD) may be included instead of the SSD 40*d*, or the SSD 40*d* or the HDD may be provided separately from the ECU 40.

The monitor device 32 includes a display device 26, a voice output device 28, and the operation input unit 30. The monitor device 32 is provided in the central part of a dashboard in the vehicle-width direction (right-left direction). The display device 26 is capable of displaying an image captured by the imaging unit 24 under the control of the ECU 40, for example, when the towing vehicle 10 tows the towed vehicle 12 backward (pushes the towed vehicle 12 back) (when the towing vehicle 10 towing the towed vehicle 12 moves backward). Details of a display mode will be described later. The display device 26 is, for example, a liquid crystal display (LCD), or an organic electroluminescent display (OELD). The voice output device 28 is, for example, a speaker. Further, in the present embodiment, the display device 26 is covered with the transparent operation input unit 30 (e.g., a touch panel). A driver (user) can visually recognize an image displayed on a screen of the display device 26 through the operation input unit 30. Further, the driver can execute an operation input (instruction input) by operating the operation input unit 30 by touching, pushing, or moving the operation input unit 30 with a finger or the like at a position corresponding to the image displayed on the screen of the display device 26. Further, in the present embodiment, for example, the monitor device 32 is shared with a navigation system and an audio system. However, a monitor device for the tow assist apparatus may be provided separately from the monitor device of these systems.

The steering system 38 includes an actuator 38*a* and the torque sensor 38*b*. The steering system 38 is electrically controlled by the ECU 40 or the like to operate the actuator 38*a*. The steering system 38 is, for example, an electric power steering system, or a steer by wire (SBW). The steering system 38 adds torque, specifically, assist torque to a steering unit (e.g., a steering wheel) with the actuator 38*a* to assist a steering force or turns a wheel 14 with the actuator 38*a*. In this case, the actuator 38*a* may turn one wheel 14 or turn a plurality of wheels 14. Further, the torque sensor 38*b*, for example, detects the torque added to the steering unit by the driver.

The steering angle sensor 44 is, for example, a sensor which detects a steering amount of the steering unit such as a steering wheel (the steering angle of the towing vehicle 10). The steering angle sensor 44 may include, for example, a Hall element. The ECU 40 acquires the steering amount of the steering unit by the driver, the steering amount of each wheel 14 during automatic steering, or the like from the steering angle sensor 44, and executes various control operations. The steering angle sensor 44 detects a rotation angle of a rotary part included in the steering unit. The steering angle sensor 44 is an example of an angle sensor.

The shift sensor 46 is, for example, a sensor that detects the position of a movable part of a gear shift operation unit such as a shift lever. The shift sensor 46 is capable of detecting the position of a lever, an arm, a button, or the like as the movable part. The shift sensor 46 may include a displacement sensor or may be configured as a switch.

The wheel speed sensor 48 is a sensor which detects a rotation amount or a rotation speed (the number of revolutions per unit time) of the wheel 14. The wheel speed sensor 48 is provided on each wheel 14, and outputs the number of wheel speed pules representing the rotation speed detected in each wheel 14 as a sensor value. The wheel speed sensor 48 can include, for example, a Hall element. The ECU 40 calculates a moving amount of the towing vehicle 10 on the basis of the sensor value acquired from the wheel speed sensor 48, and executes various control operations.

Note that the configuration, arrangement, electrical connection mode, and the like of the various sensors and actuators described above are merely examples, and can be variously set (modified).

Figure 4:
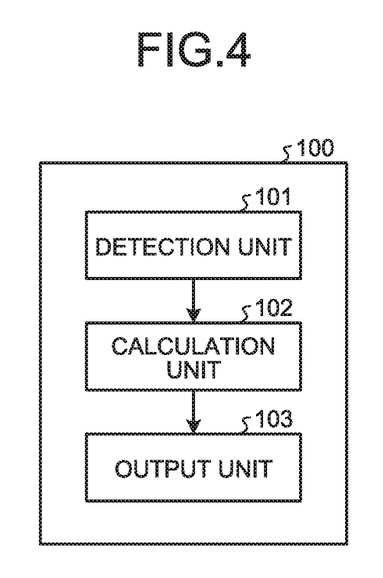
FIG. 4 is a diagram illustrating an example of functions included in the tow assist system according to the first embodiment.

FIG. 4 is a diagram illustrating an example of functions included in the tow assist system 100 according to the present embodiment. For convenience of description, while functions related to the present invention are mainly illustrated in the example of FIG. 4, functions included in the tow assist system 100 are not limited to these functions. As illustrated in FIG. 4, the tow assist system 100 includes a detection unit 101, a calculation unit 102, and an output unit 103.

In this example, the functions of the detection unit 101, the calculation unit 102, and the output unit 103 are implemented by that, the CPU 40*a* executes a program stored in the storage device such as the ROM 40*b*. However, not limited thereto, for example, at least some of the above functions may be implemented by a dedicated hardware circuit. In this example, the functions of the detection unit 101, the calculation unit 102, and the output unit 103 can also be considered to be functions included in the ECU 40, Thus, it may be considered that the ECU 40 corresponds to the "tow assist apparatus". Further, the program executed by the CPU 40*a* of the present embodiment may be provided by being recorded in a computer-readable recording medium, such as a CD-ROM, a flexible disk (FD), a CD-R, a digital versatile disk (DVD), or a universal serial bus (USB) as a file in a installable format or an executable format, or may be provided or distributed over a network, such as the Internet. Further, various programs may be provided by being previously incorporated in a nonvolatile storage medium, such as a ROM.

The detection unit 101 detects, at a predetermined period, the angle (coupling angle $\theta$) of tilt of the towed vehicle 12 to the towing vehicle 10. The tilt arises when the towing vehicle 10 towing the towed vehicle 12 moves backward. In this example, the detection unit 101 acquires at the predetermined period the image captured by the imaging unit 24, and detects (recognizes) the coupling angle $\theta$ by image recognition using the acquired image every time the image is acquired. Note that, as described above, in the mode in which the sensor for detecting the coupling angle $\theta$ is provided on the hitch ball 19, the detection unit 101 can also detect the coupling angle $\theta$ by acquiring information representing the coupling angle $\theta$ from the sensor at the predetermined period. In short, it is only required that the detection unit 101 have a function of detecting the coupling angle $\theta$ at the predetermined period when the towing vehicle 10 moves backward. In this example, the detection unit 101 performs the detection of the coupling angle $\theta$ every 100 ms. However, the predetermined period described above can be changed in any manner.

The calculation unit 102 calculates angle change information representing a temporal change in the angle (coupling angle $\theta$) detected by the detection unit 101. In this example, the calculation unit 102 calculates, as the angle change information, a change rate of the coupling angle θ detected by the detection unit 101. More specifically, the calculation unit 102 sequentially calculates the change rate of the coupling angle θ (angle change information) by dividing the difference between the two latest and second latest values of the coupling angles θ detected by the detection unit 101 (the latest coupling angle θ—the second latest coupling angle θ) by 100 ms, which is the length of the predetermined period. When the detected coupling angle θ fluctuates, a low-pass filter may be applied to the coupling angle θ or the angle change information (the change rate of the coupling angle θ).

Note that, in this example, the change rate of the coupling angle θ is used as the angle change information. However, not limited thereto, for example, an acceleration of a change in the coupling angle θ may be used as the angle change information. In summary, it is only required that the angle change information be information representing a temporal change in the angle detected by the detection unit 101.

Figure 5:
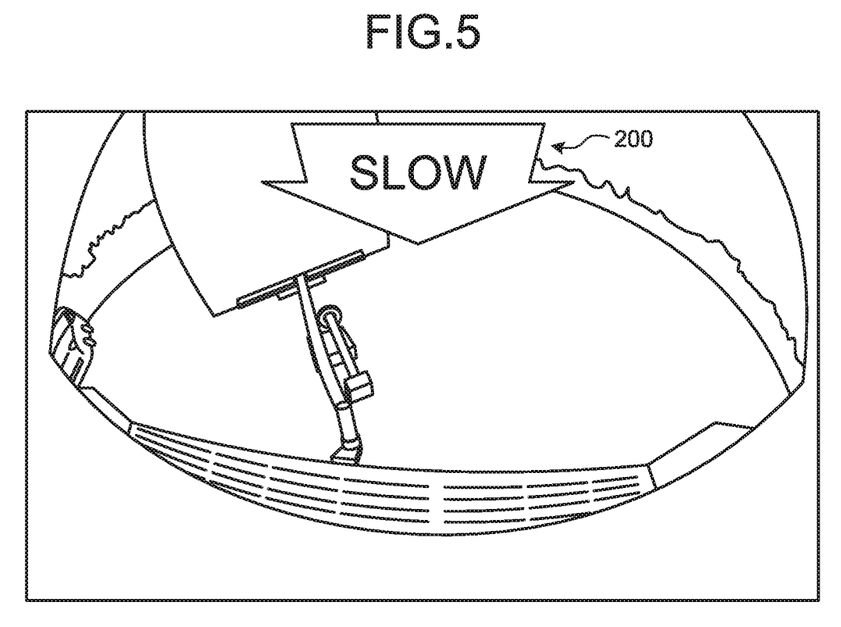
FIG. 5 is a diagram illustrating an example of an image in which information for urging deceleration of the towing vehicle is superimposed on an image captured by an imaging unit.
Figure 6:
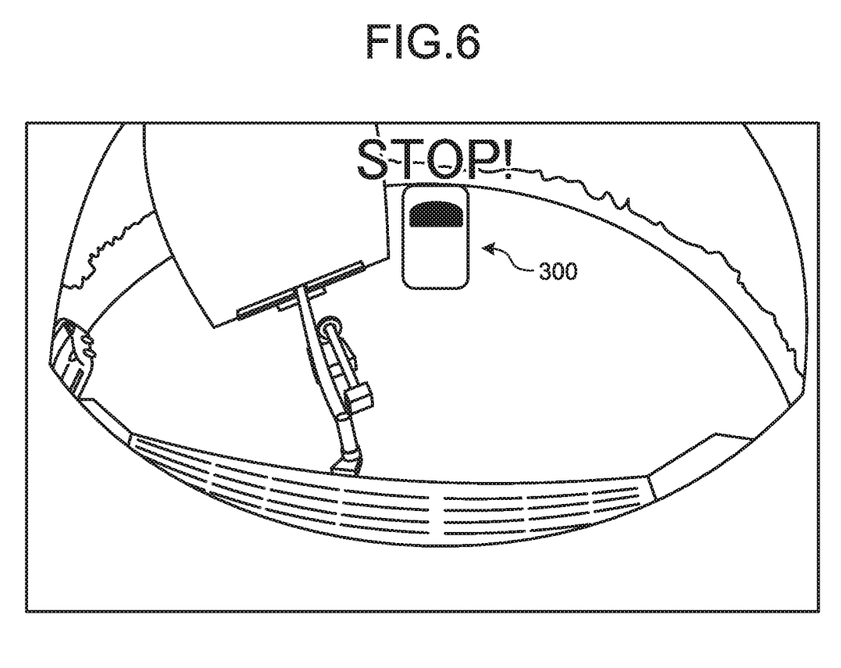
FIG. 6 is a diagram illustrating an example of an image in which information for urging stop of the towing vehicle is superimposed on an image captured by the imaging unit.

The output unit 103 outputs an alarm when the angle change information calculated by the calculation unit 102 exceeds a threshold. In this example, the output unit 103 outputs the alarm when the change rate of the coupling angle θ calculated by the calculation unit 102 exceeds the threshold. For example, the output unit 103 can display an image (rear image) captured by the imaging unit 24 when the change rate of the coupling angle θ exceeds the threshold on the display device 26 and also display information representing the alarm on the displayed image. For example, as illustrated in FIG. 5, the display device 26 may display an image in which information 200 (an example of "the information representing the alarm") for urging deceleration of the towing vehicle 10 (an icon indicating "SLOW" in the example of FIG. 5) is superimposed on the image captured by the imaging unit 24. Further, the information representing the alarm is optional. For example, as illustrated in FIG. 6, information 300 (an icon indicating "STOP" in the example of FIG. 6) for urging stop of the towing vehicle 10 may be displayed instead of the information 200 for urging deceleration.

Further, the alarm output mode is not limited to display output, and may be, for example, voice output. For example, the output unit 103 can also output alarm sound (a sound for an alarm) from the voice output device 28 when the angle change information calculated by the calculation unit 102 exceeds the threshold. The output mode of the alarm sound is optional. For example, a single alarm sound may be output when the alarm is output for the first time, and continuous alarm sounds may then be output until an alarm end condition is satisfied. The display output and the voice output may be performed in combination. For example, the output unit 103 may display the image illustrated in FIG. 5 on the display device 26 and also output the alarm sound. Similarly, for example, the output unit 103 may display the image illustrated in FIG. 6 on the display device 26 and also output the alarm sound.

As the alarm end condition, an end threshold which is lower than the above threshold may be previously set, and the output unit 103 may stop output of the alarm when the angle change information becomes equal to or lower than the end threshold. By this configuration, it is possible to prevent frequent repetition of output/stop of the alarm (that is, it is possible to prevent hunting of the alarm output).

Note that, in the present embodiment, the ECU 40 has the function of "the output unit configured to output an alarm". However, not limited thereto, for example, it may be considered that a combination of the ECU 40 and the display device 26 or the voice output device 28 corresponds to the function of "the output unit configured to output an alarm", or the display device 26 or the voice output device 28 corresponds to the function of "the output unit configured to output an alarm".

Figure 7:
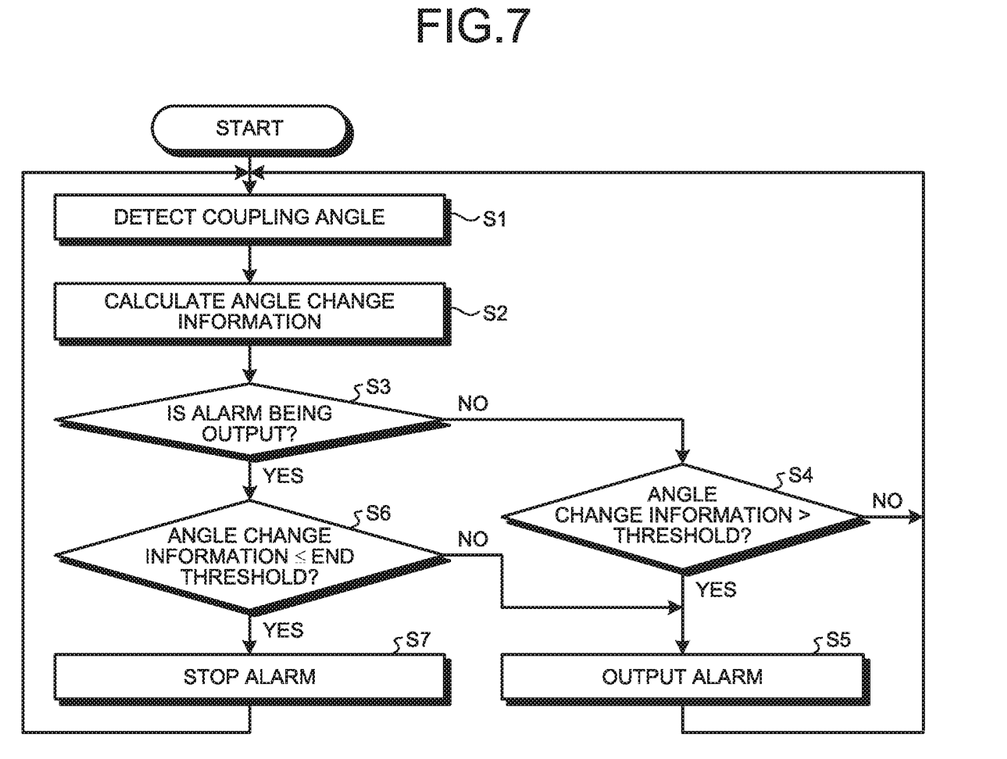
FIG. 7 is a flowchart illustrating an operation example of the tow assist system.

FIG. 7 is a flowchart illustrating an operation example of the tow assist system 100 (ECU 40) when the towing vehicle 10 towing the towed vehicle 12 moves backward. Details of each step are already described above, so that detailed description thereof will be appropriately omitted. As illustrated in FIG. 7, the detection unit 101 detects the coupling angle θ described above (step S1). Next, the calculation unit 102 calculates the angle change information described above (step S2). As described above, the calculation unit 102 can calculate the angle change information (the change rate of the coupling angle θ in this example) by dividing the difference between the coupling angle θ detected in step S1 and the coupling angle θ detected last time by 100 ms, which is the length of the predetermined period (which is also a repetition period of the flow illustrated in FIG. 7).

Then, when no alarm is currently being output (step S3: No), the output unit 103 determines whether the angle change information calculated in step S2 exceeds the threshold (step S4). When a result of step S4 is affirmative (step S4: Yes), the output unit 103 outputs an alarm (step S5). On the other hand, when a result of step S4 is negative (step S4: No), the process returns to step S1.

When an alarm is currently being output in step S3 (step S3: Yes), the output unit 103 determines whether the angle change information calculated in step S2 is equal to or lower than the end threshold (step S6). When a result of step S6 is negative (step S6: No), the output unit 103 outputs an alarm (step S5). In other words, the alarm output is continued. On the other hand, when a result of step S6 is affirmative (step S6: Yes), the output unit 103 stops the alarm output (step S7), and the process returns to step S1. The above-described operation is specific details of the operation of the tow assist system 100 (ECU 40) when the towing vehicle 10 moves backward.

Figure 8:
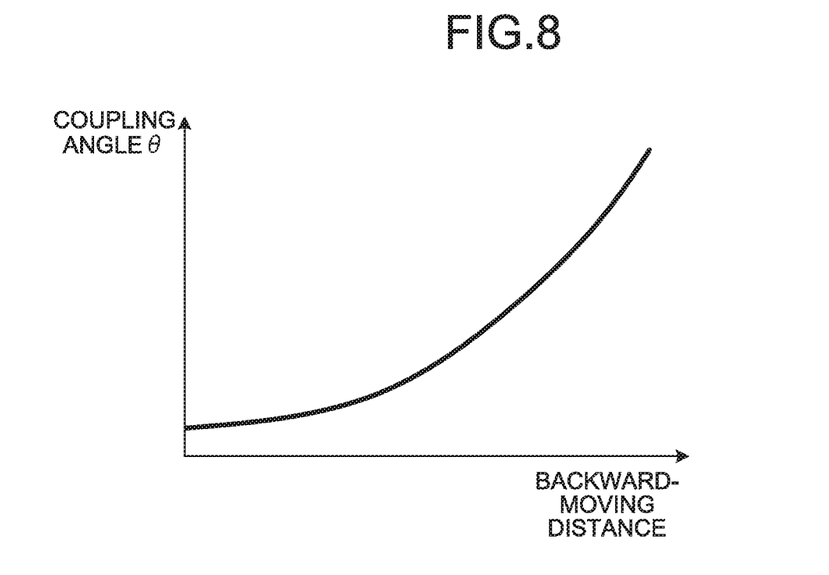
FIG. 8 is a diagram for describing a tendency that an angle of the towed vehicle to a backward-moving distance exponentially increases.

Incidentally, when the towing vehicle 10 towing the towed vehicle 12 moves backward (in the case of backward towing), even when the steering angle of the towing vehicle 10 is kept constant, the angle of the towed vehicle 12 (the coupling angle θ) tends to exponentially increase with respect to the backward-moving distance (See FIG. 8). FIG. 8 is a diagram illustrating the relation between the coupling angle θ and the backward-moving distance. This tendency varies according to the wheel base of the towing vehicle 10, the wheel base of the towed vehicle 12 (the length between the coupler which covers the hitch ball 19 and the wheel of the towed vehicle 12), the steering angle of the towing vehicle, and the like. Thus, it is difficult to determine a threshold of an alarm on the basis of, for example, the moving speed of the towing vehicle 10.

In contrast, in the present embodiment described above, it is determined whether the alarm output is enabled or disabled based on whether the angle change information (the change rate of the coupling angle θ in this example) representing the temporal change in the coupling angle θ when the towing vehicle 10 towing the towed vehicle 12 moves backward exceeds the threshold. Thus, it is possible to reduce the influence of the wheel bases and the steering angle, and possible to determine whether the alarm output is enabled or disabled with the same threshold without depending on, for example, the wheel bases and the steering angle. Further, in the present embodiment described above, when the angle change information exceeds the threshold, the alarm is output. Thus, it is possible to prevent moving with the coupling angle θ which is unintended by the driver (that is, it is possible to urge safe driving).

Figure 9:
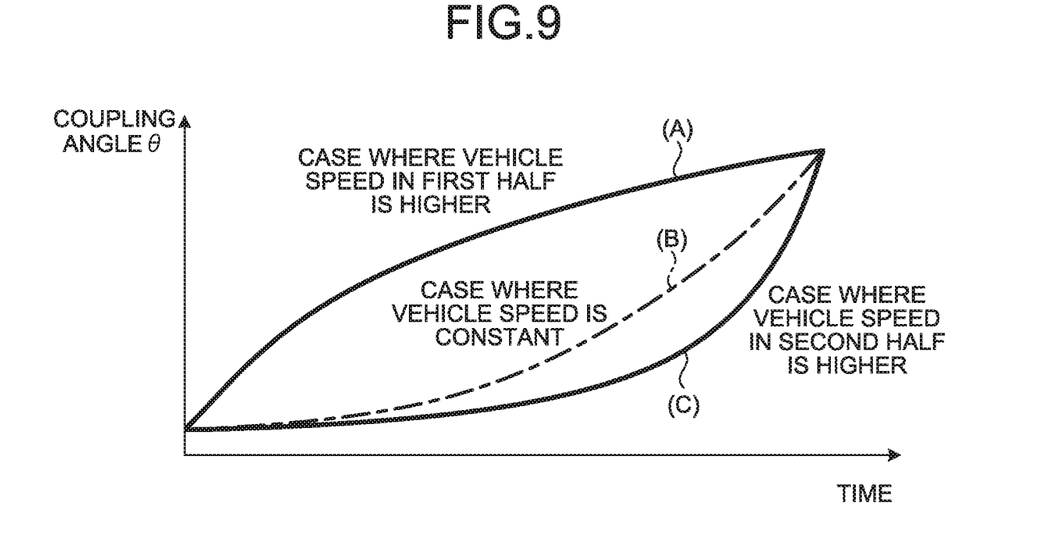
FIG. 9 is a diagram illustrating a relation between a vehicle speed and a coupling angle.

Note that, it is considered that the behavior of the towing vehicle 10 towing the towed vehicle 12 in backward-moving, for example, during parking varies from driver to driver. As illustrated in FIG. 9, the behavior may include (A) a case where the vehicle speed in the first half is higher, (B) a case where the vehicle speed is constant, and (C) the vehicle speed in the second half is higher. In the present embodiment described above, the alarm is output only when the change rate of the coupling angle θ exceeds the threshold. Thus, even when the behavior in backward-moving varies from driver to driver in this manner, the alarm can be output at an appropriate timing without being affected by the behavior in backward-moving (in any mode of the behavior in backward-moving).

Second Embodiment

Next, a second embodiment will be described. In the present embodiment, an alarm is output in a state where a display image is displayed, which includes a towed vehicle 12 generated on the basis of a captured image including the towed vehicle 12 captured by an imaging unit capturing an image around a towing vehicle 10. Thereinafter, details thereof will be described. Note that description of common parts between the second embodiment and the first embodiment described above will be appropriately omitted.

Figure 10:
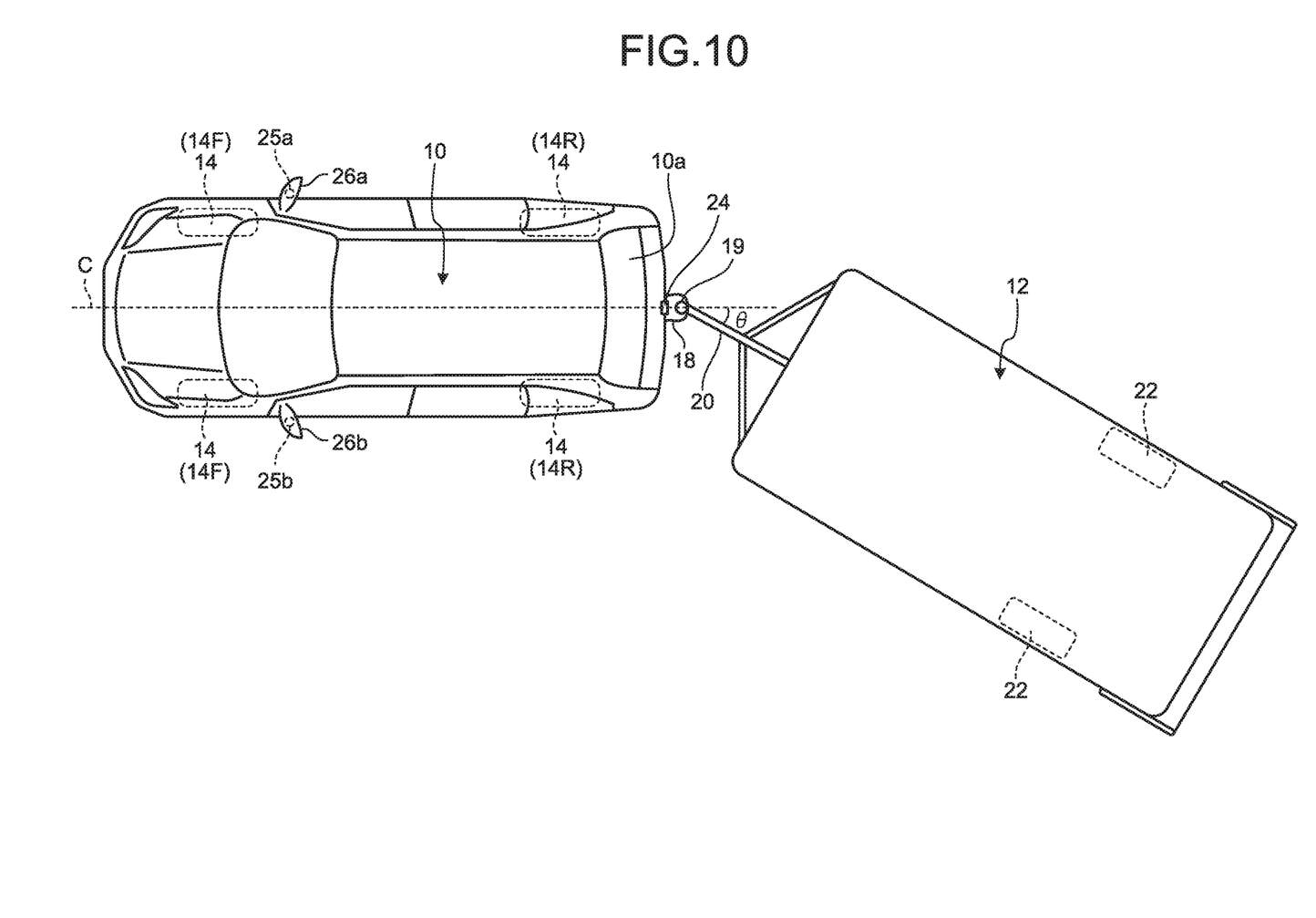
FIG. 10 is a top view of a towing vehicle and a towed vehicle towed by the towing vehicle according to a second embodiment.

FIG. 10 is a top view of the towing vehicle 10 and the towed vehicle 12 according to the present embodiment. As illustrated in FIG. 10, as an example of the imaging unit configured to capture an image around the towing vehicle 10, the towing vehicle 10 includes a side camera that captures an image on the lateral side of the towing vehicle 10. The side camera includes a first side camera 25a and a second side camera 25b. The first side camera 25a is located on an end of the right side (the right side in the vehicle-width direction) of a vehicle body, and is provided on a side mirror 26a on the right side. The second side camera 25b is located on an end of the left side (the left side in the vehicle-width direction) of the vehicle body, and is provided on a side mirror 26b on the left side. In this example, the first side camera 25a and the second side camera 25b perform imaging at a predetermined frame rate. In other words, a first side image and a second side image are output at the predetermined frame rate.

Figure 11:
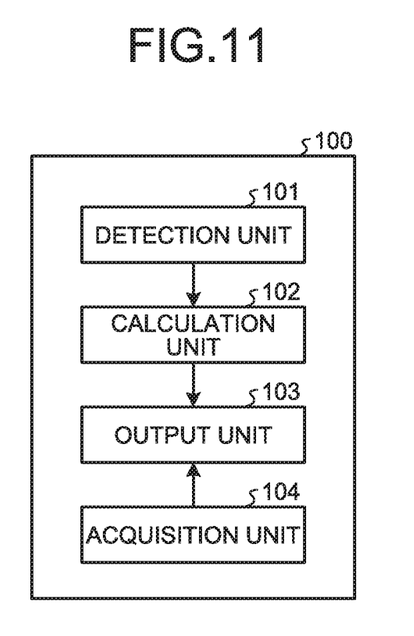
FIG. 11 is a diagram illustrating an example of functions included in a tow assist system according to the second embodiment.

FIG. 11 is a diagram illustrating an example of functions included in a tow assist system 100 according to the present embodiment. As illustrated in FIG. 11, the tow assist system 100 further includes an acquisition unit 104. The acquisition unit 104 acquires a captured image including the towed vehicle 12. The captured image is captured by the imaging unit that captures an image around the towing vehicle 10. In this example, the acquisition unit 104 acquires the first side image and the second side image. The first side image represents an image captured by the first side camera 25a for capturing an image on the right side of the towing vehicle 10. The second side image represents an image captured by the second side camera 25b for capturing an image on the left side of the towing vehicle 10. In this example, the acquisition unit 104 is capable of acquiring each of the first side image and the second side image at the predetermined frame rate. The other configuration is similar to the configuration of the first embodiment except part of the function of the output unit 103, so that detailed description thereof will be omitted.

In the present embodiment, the output unit 103 outputs an alarm in a state where the display image including the towed vehicle 12, the display image being generated on the basis of the captured image acquired by the acquisition unit 104, is displayed. Note that the display image may be displayed even when angle change information does not exceed a threshold (that is, be displayed not at a timing of outputting alarm). In this example, the display image is generated on the basis of one of the first side image and the second side image, the one corresponding to a side to which the towed vehicle 12 tilts. In this example, the output unit 103 generates the display image by executing viewpoint-converting on the side image including the towed vehicle 12, which is captured by the side camera capturing an image on the lateral side of the towing vehicle 10, to obtain an image viewed rearward from the lateral side of the towing vehicle 10.

Figure 12:
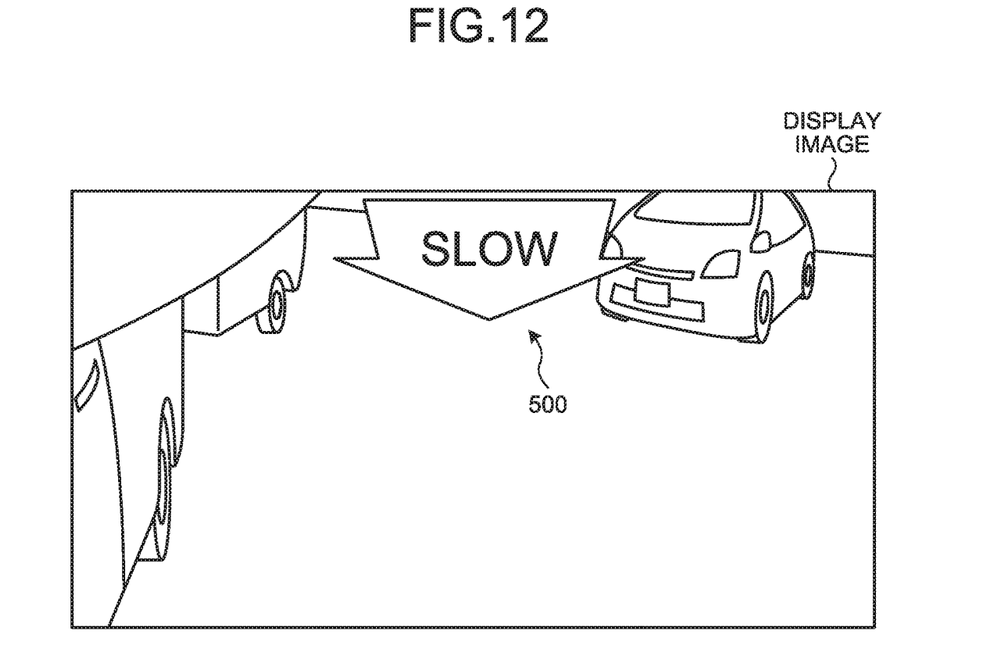
FIG. 12 is a diagram illustrating an example of an image in which information for urging deceleration of the towing vehicle is superimposed on a second side image.
Figure 13:
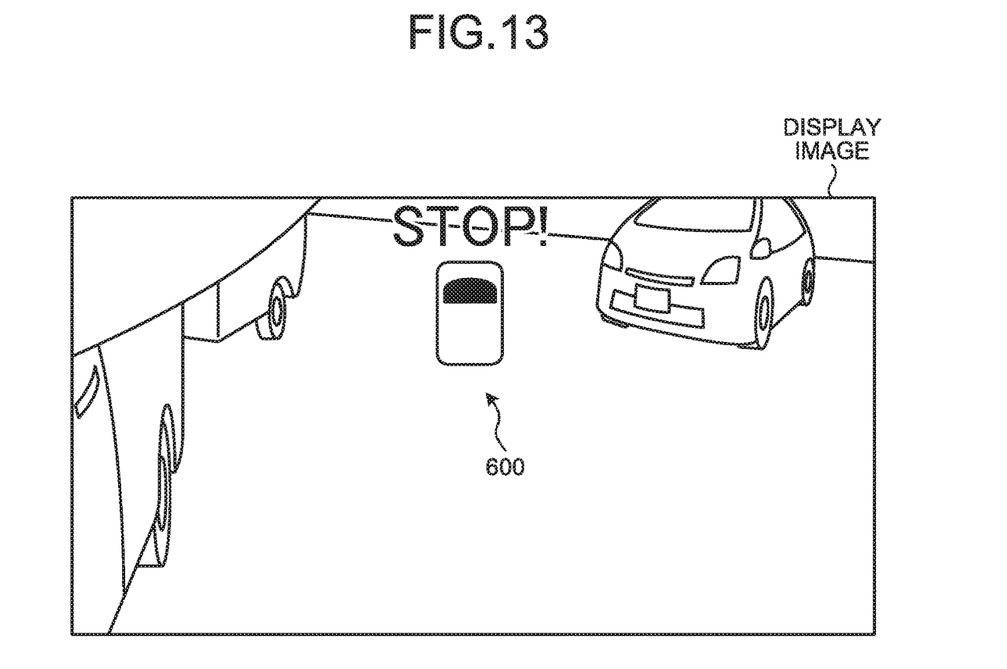
FIG. 13 is a diagram illustrating an example of an image in which information for urging stop of the towing vehicle is superimposed on the second side image.

When, for example, the angle change information exceeds the threshold, the output unit 103 displays the display image generated on the basis of one of the first side image or the second side image acquired by the acquisition unit 104, the one corresponding to a side to which the towed vehicle 12 tilts. For example, when the towed vehicle 12 tilts to the left side of the towing vehicle 10, as illustrated in FIG. 12, the output unit 103 can display on the display device 26 a display image based on the second side image captured by the second side camera 25b, and can perform control for displaying information representing an alarm on the display image. The display image illustrated in FIG. 12 is an image generated by executing viewpoint-converting on the second side image including the towed vehicle 12 to obtain an image viewed rearward from the lateral side of the towing vehicle 10. In the example of FIG. 12, the output unit 103 displays on the display device 26 an image in which information 500 for urging deceleration of the towing vehicle 10 (an icon indicating "SLOW" in the example of FIG. 12) is superimposed on the display image. Alarm sound may be output in addition to display of the display image, or alarm sound may be output instead of display of the image representing the alarm. Further, for example, as illustrated in FIG. 13, information 600 (an icon indicating "STOP" in the example of FIG. 13) for urging stop of the towing vehicle 10 may be displayed instead of the information 500 for urging deceleration. Alarm sound may be output in addition to display of the display image, or alarm sound may be output instead of display of the image representing the alarm. Further, for example, the imaging unit capturing an image around the towing vehicle 10 may be provided such that the captured image including the towed vehicle 12 becomes modes of FIGS. 12 and 13, without performing the viewpoint conversion described above. In other words, the captured image including the towed vehicle 12 captured by the imaging unit, which captures an image around the towing vehicle 10, may be used as it is as the display image.

Further, not limited to the above configuration, the output unit 103 may display for example, a display image generated on the basis of one of the first side image or the second side image acquired by the acquisition unit 104, the one corresponding to a side to which the towed vehicle 12 tiles, even when the angle change information does not exceed the threshold.

The flow of the operation of the tow assist system 100 (ECU 40) when the towing vehicle 10 towing the towed vehicle 12 moves backward is similar to the flow of FIG. 7. However, in step S5, the flow of the second embodiment differs from the flow of the first embodiment only in that, the output unit 103 of the present embodiment outputs the alarm and the display image which is based on the side image on the tilt side of the towed vehicle 12. In the present embodiment described above, when the coupling angle θ exceeds the threshold, the display image including the towed vehicle 12 based on the captured image around the towing vehicle 10 is displayed. Thus, it is possible for the driver to visually recognize a moving state of the towed vehicle 12, and to ascertain that the towed vehicle 12 is moving with an angle different from his/her prediction. More specifically, the display image based on the side image on the tilt side of the towed vehicle 12 is displayed, so that the driver can easily visually recognize the tilt condition of the towed vehicle 12.

The embodiments according to the present invention have been described above. However, the present invention is not limited to the above embodiments as they are, and can be embodied by modifying the elements without departing from the gist thereof in the implementation phase. Further, various inventions can be formed by appropriately combining a plurality of elements disclosed in the above embodiments. For example, some of all the elements shown in the embodiments may be deleted. Furthermore, elements related to different embodiments and modifications may be appropriately combined.

What is claimed is:

1. A tow assist apparatus comprising:
    a hardware processor configured to:
        detect, at a predetermined period, an angle of tilt of a towed vehicle to a towing vehicle towing the towed vehicle, the tilt arising when the towing vehicle moves backward;
        calculate angle change information representing a temporal change in the detected angle;
        acquire a first side image and a second side image, the first side image representing an image captured by a first side camera capturing an image of respective right sides of the towing vehicle and the towed vehicle, the second side image representing an image captured by a second side camera capturing an image of respective left side of the towing vehicle and the towed vehicle; and
        generate a display image and output an alarm while displaying the display image on a display device when the angle change information exceeds a threshold, the display image including respective right or left side surfaces of the towing vehicle and the towed vehicle, the display image being generated based on one of the first and second side images, the one corresponding to a side to which the towed vehicle tilts, the output of the alarm being performed by superimposing an image representing the alarm onto the display image displayed on the display device.

2. The tow assist apparatus according to claim 1, wherein the angle change information represents a change rate of the detected angle.

3. The tow assist apparatus according to claim 1, wherein the angle change information represents an acceleration of change in the detected angle.

4. The tow assist apparatus according to claim 1, wherein the output of an alarm is performed by outputting voice through a voice output device.

5. A tow assist method implemented by a computer installed in a towing vehicle, the method comprising:
    detecting, at a predetermined period, an angle of tilt of a towed vehicle to a towing vehicle towing the towed vehicle, the tilt arising when the towing vehicle moves backward;
    calculating angle change information representing a temporal change in the detected angle;
    acquiring a first side image and a second side image, the first side image representing an image captured by a first side camera capturing an image of respective right sides of the towing vehicle and the towed vehicle, the second side image representing an image captured by a second side camera capturing an image of respective left side of the towing vehicle and the towed vehicle; and
    generating a display image and outputting an alarm while displaying the display image on a display device when the angle change information exceeds a threshold, the display image including respective right or left side surfaces of the towing vehicle and the towed vehicle, the display image being generated based on one of the first and second side images, the one corresponding to a side to which the towed vehicle tilts, the output of the alarm being performed by superimposing an image representing the alarm onto the display image displayed on the display device.

* * * * *